Nov. 4, 1958 H. G. CHAPMAN, JR 2,858,947
REMOTE CONTROL MANIPULATING APPARATUS
Filed Nov. 16, 1953 4 Sheets-Sheet 2
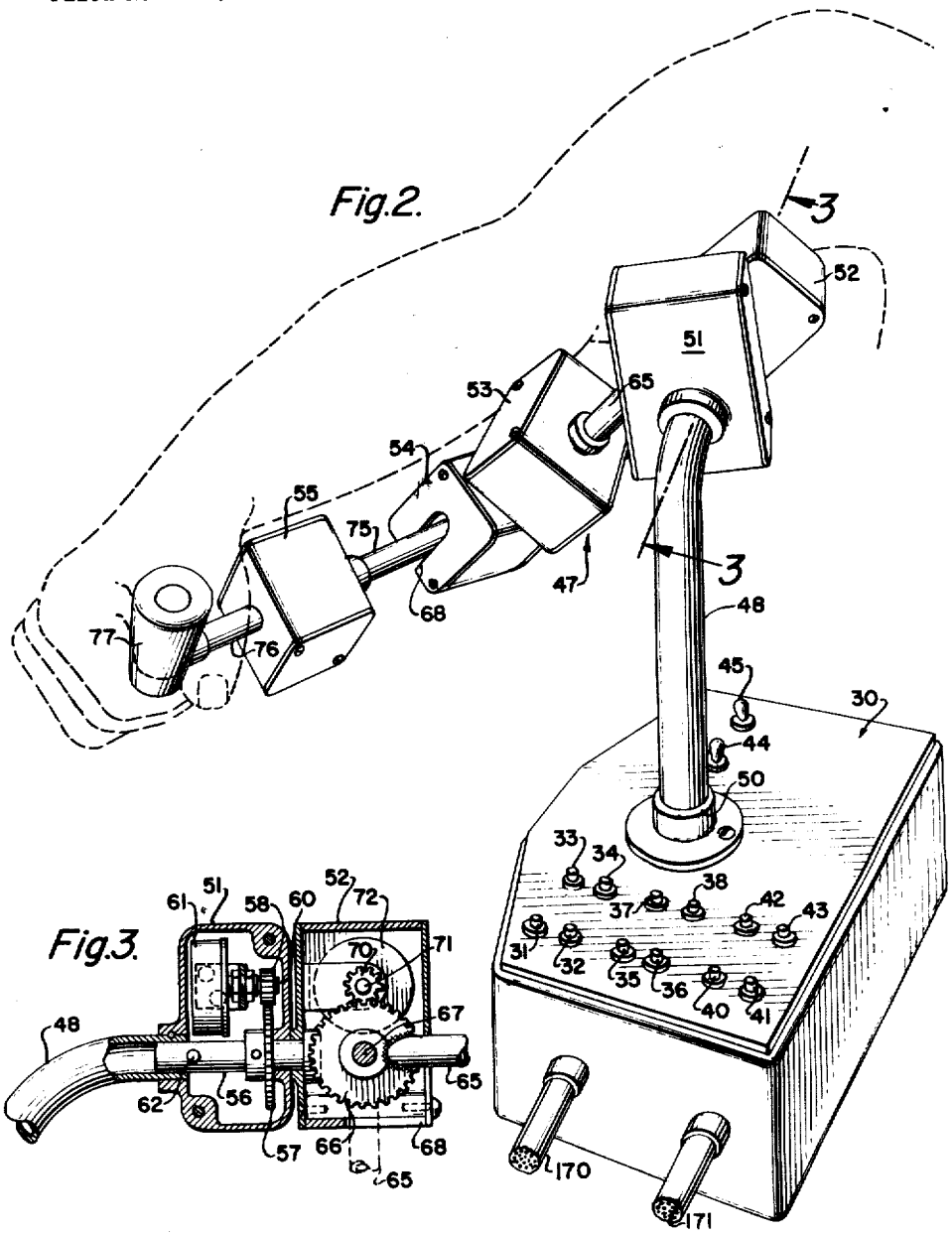
HARVEY G. CHAPMAN, JR.,
INVENTOR.
BY John H. Walker

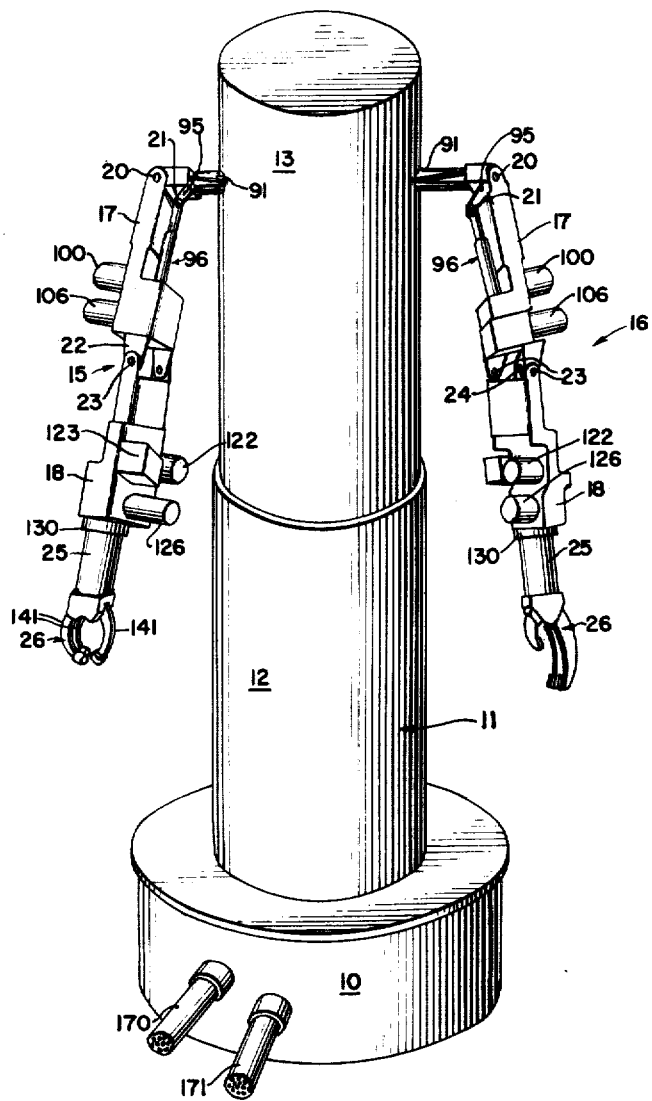

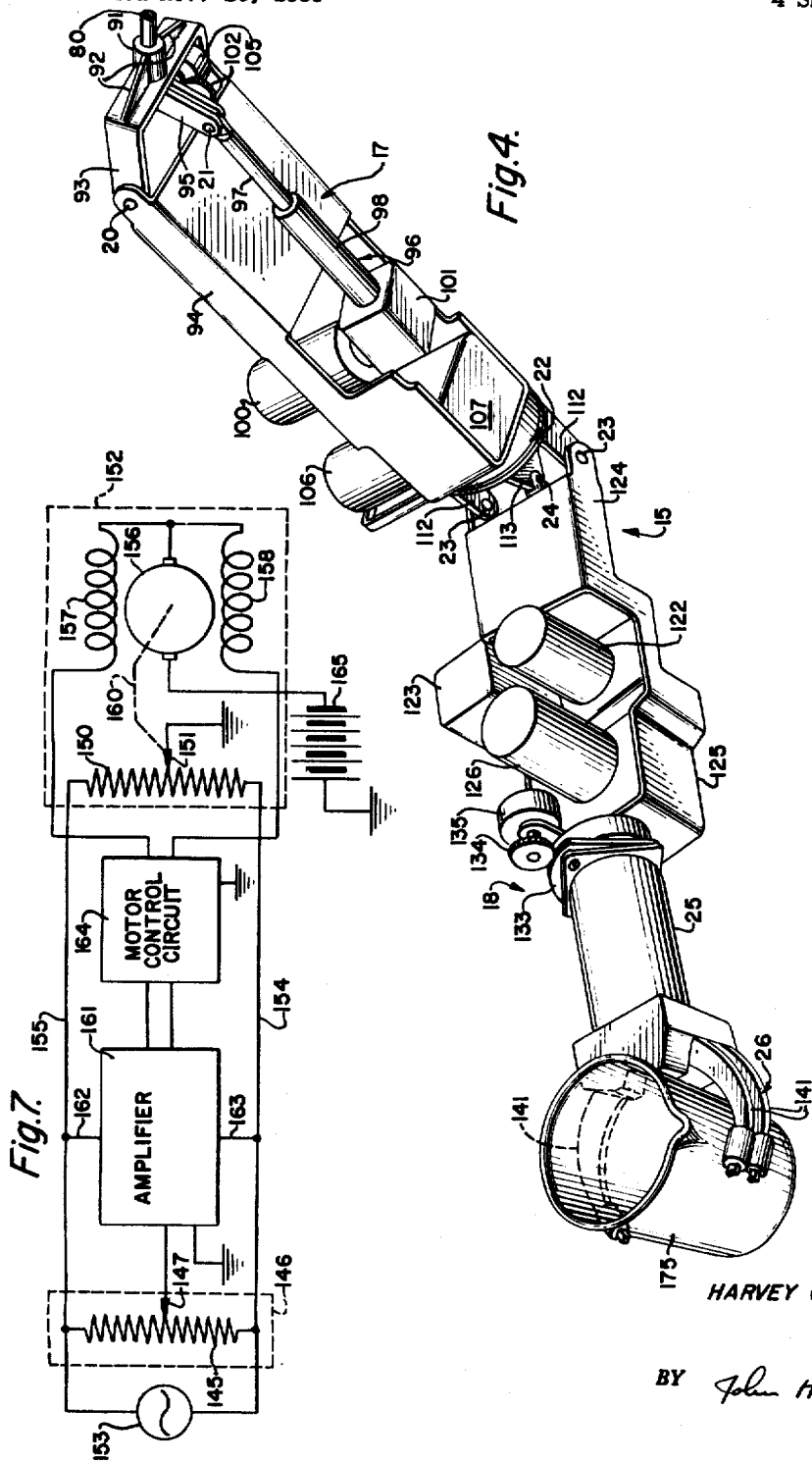

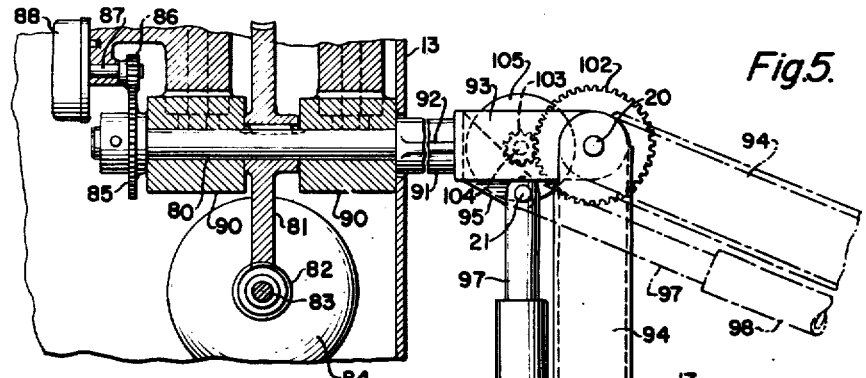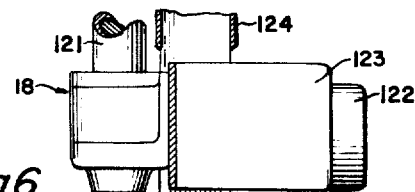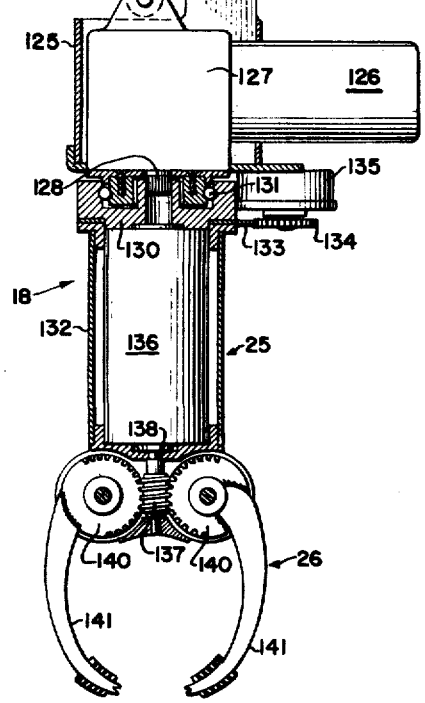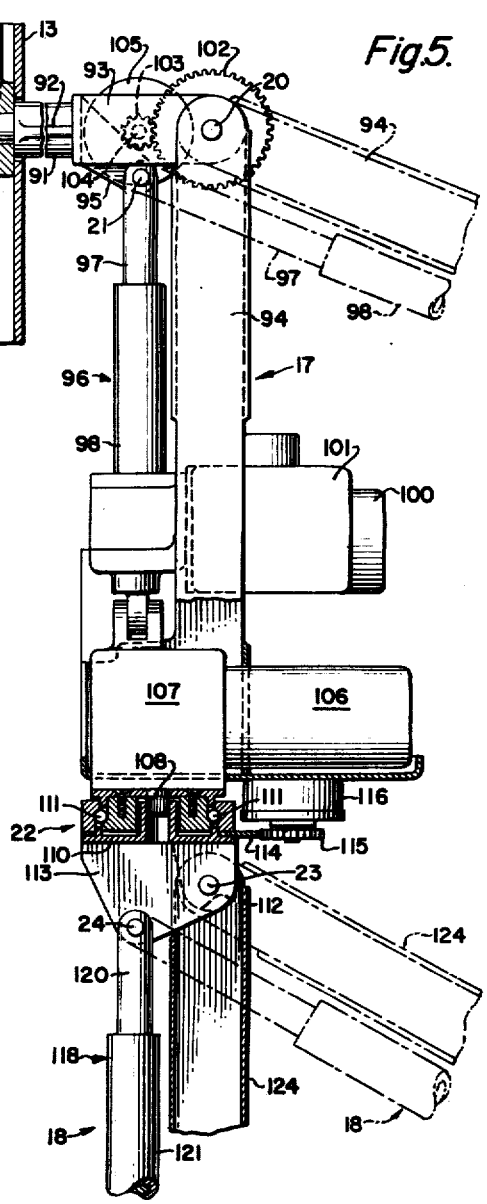

United States Patent Office 2,858,947
Patented Nov. 4, 1958

2,858,947

REMOTE CONTROL MANIPULATING APPARATUS

Harvey G. Chapman, Jr., Glendale, Calif., assignor to The Garrett Corporation, Los Angeles, Calif., a corporation of California Application November 16, 1953, Serial No. 392,375

14 Claims. (Cl. 214—1)

This invention relates generally to material handling devices, and particularly relates to remotely controlled manipulating apparatus.

Remotely controlled manipulating devices have potentially wide fields of application. Such devices are useful wherever conditions are encountered which are injurious or deadly to man. For example, it may be necessary to perform operations in atmospheres containing poisonous dust, gases, fluids, bacteria, fungi, or radioactive materials, or under conditions which are hot or cold beyond the limits of human endurance or at pressures above or below atmospheric. Thus, it may be necessary to handle radioactive materials or it may be desirable to process metals in vacuo, for example, for alloying, casting or brazing certain metals. Furthermore, it may be necessary to load ammunition with explosives or otherwise to handle such materials, or to perform operations under water, such, for example, as welding, cutting, or salvage work under water.

In order to perform operations under such conditions, various manually controlled manipulators have been suggested in the past. Most of these manipulators are controlled from a remote point and the motion may be transmitted by mechanical means, although some manipulators include electric motors and control circuits therefor. Devices such as artificial limbs which are controlled from a remote point may also be considered as material handling devices. Generally such prior art devices are cumbersome and are limited in their movements. Furthermore, considerable practice is required for an operator to use such devices with any degree of skill. This is primarily due to the fact that the remote manipulator is usually provided with articulated joints and each joint must be controlled independently by the operator. Thus in order to obtain a fairly smooth movement of a claw or tongs utilized in handling or gripping materials, the operator must cause coordinated or integrated movements of the various joints of the manipulator.

It is accordingly an object of the present invention to provide improved manipulating apparatus including a master arm actuated by the hand of an operator and a slave or robot arm remotely disposed from and controlled by the master arm in such a manner that the slave arm will follow movements of the master arm in space under the control of the operator.

Another object of the invention is to provide remotely controlled manipulating apparatus which may readily be controlled by an operator without previous practice and which does not require the operator to view the remote slave arm of the apparatus during its movement.

A further object of the invention is to provide a remotely controlled manipulator of the type referred to having a slave arm which is capable of reproducing in three dimensions any movement of the human arm and which can be controlled automatically by an operator at a remote point by simply moving the free end of the master arm into a desired position without requiring separate control of the individual joints of the master arm.

A remotely controlled manipulating apparatus in accordance with the present invention comprises an arm-like master device having a plurality of joints. One end of the master device or master arm is movably connected to a fixed point so as to permit movement of the free end of the master arm in three dimensions about its fixed point. The remote slave arm is constructed similar to the master arm and also has a plurality of joints corresponding to those of the master arm, one end of the slave arm being movably connected to a fixed point. A separate servo follow-up mechanism which may include a Wheatstone bridge, an amplifier, and an electric motor, is provided for each joint of the master arm and the corresponding joint of the slave arm. The motor serves the purpose of positioning the joint of the slave arm. Consequently, when the free end of the master arm is moved by an operator, the free end of the slave arm automatically moves in space to follow the movements of the master arm.

It is feasible to provide a predetermined relationship between the dimensions of the master arm and those of the slave arm. Consequently, movements of the master arm will cause corresponding movements of the slave arm, for example, on a larger scale. In that case, it is not necessary for the operator to see the master arm provided he is equipped, for example, with a suitable table on a reduced scale which corresponds to a similar larger table on which the slave arm will perform the same movements to manipulate the materials to be moved.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is a perspective view on a reduced scale of the remotely controlled slave or robot device in accordance with the present invention, said device having an automatically controlled arm and another arm controlled manually by the operator;

Fig. 2 is a perspective view of the master control device of the invention including a master arm and a control box for controlling remotely the two arms of the slave device of Fig. 1;

Fig. 3 is a sectional view taken on line 3—3 of Fig. 2, and illustrating two joints of the master arm permitting respectively rotary and bending movements;

Fig. 4 is a perspective view, on a larger scale, of the automatically controlled slave arm included in the device of Fig. 1, the position of the slave arm corresponding to that of the master arm as illustrated in Fig. 2;

Figs. 5 and 6 are elevational views, partly in section, illustrating on a still larger scale respectively, the upper arm with shoulder and the forearm of the slave arm in a downward position; and Fig. 7 is a schematic circuit diagram of the electric follow-up mechanism including an electric motor for automatically positioning a joint of the slave arm in accordance with the position of the corresponding joint of the master arm.

Referring now to the drawings, in which like elements are designated by the same reference characters, and particularly to Fig. 1, there is illustrated a robot or slave device including a fixed platform or base 10 and a hollow cylinder rotatably mounted in the base 10. If desired, the cylinder 11 may consist of a lower portion 12 and an upper portion 13 as illustrated which are telescopically mounted within each other for adjusting the total height of the cylinder. Such adjustment may be effected by an electric motor which may be controlled by a switch in any conventional manner, the details of its construction being not shown here.

The slave device shown in Fig. 1 is provided with an automatically controlled right slave arm 15 and a manually controlled left slave arm 16. Aside from the fact that only one of the arms is automatically controlled in accordance with the present invention, the two arms may be of identical construction as illustrated. Accordingly only the details of construction of the automatically controlled slave arm 15 will be described. The right slave arm 15 is provided with a number of articulated joints, some of which permit bending of the members connected by the joint while others permit rotation about the longitudinal axis of the associated members. Any number of joints may be provided for substantially reproducing all the movements of which the human arm is capable. However, it will be understood that depending upon the particular use of the material handling apparatus of the invention, the actual number of joints may be increased or decreased from that shown in the drawings.

The slave arm 15 includes an upper arm 17 and a forearm 18. The upper arm 17 is arranged to rotate with respect to the cylinder 11, the actual joint being disposed within the upper cylinder portion 13. This joint will cause rotation of the entire arm 15 in a plane intersecting at right angles, the plane which passes through the two arms 15 and 16. In other words, this joint permits rotation of the slave arm corresponding to swinging of the human arm. Furthermore, the upper arm 17 together with the lower arm 18 are pivoted about two pivot points 20 and 21 to permit bending of the arm. This movement corresponds to an up and down movement of the human arm in a plane which passes through the two arms 15 and 16.

The forearm 18 is permitted to rotate about its longitudinal axis as shown at 22. This movement corresponds to the rotation of the humerus about the shoulder joint. Furthermore, the forearm 18 is permitted to bend about two pivots shown at 23 and 24. This latter movement corresponds to the movement of the human elbow and permits bending of the forearm 18 with respect to the upper arm 17. Finally, the lower portion 25 of the forearm 18 is permitted to rotate about its longitudinal axis, and this movement corresponds to the rotation of the human wrist caused by a twisting movement of the ulna and of the radius. The slave arm does not have a joint corresponding to the bending motion of the human wrist, but such a joint could easily be provided if desired. The lower end of the arm may be provided with a claw or tongs 26 for gripping or handling materials.

As explained hereinbefore, the left slave arm 16 has the same construction as the right arm and hence further description thereof is not necessary. A more detailed description of the construction and operation of the slave arm 15 will be given later as the description proceeds.

Figs. 2 and 3 illustrate the master arm and associated control mechanism for automatically controlling the right slave arm 15 and for manually controlling the left slave arm 16. The master control device includes a control box 30 which may be provided with a plurality of push buttons 31, 32, 33, 34, 35, 36, 37, 38, 40, 41, 42 and 43 which serve the purpose of controlling the left slave arm 16. Another pair of toggle switches 44 and 45 are provided for controlling opening and closing of the claw 26 of the right slave arm 15. The manner in which the push buttons and toggle switches 33 to 38, 40 to 45 control respectively the left slave arm 16 and the claw 26 of the right slave arm 15, will be described later.

In accordance with the present invention, the master control device as illustrated in Fig. 2 further includes a master arm generally indicated at 47. The master arm 47 comprises a hollow tube 48 which is rotatably mounted in a sleeve 50 secured to the control box 30 in the manner to be described hereinafter. Rotation of the tube 48 about its vertical axis with respect to the control box 30 controls rotation of the cylinder 11 of the slave device.

Five control housings 51, 52, 53, 54 and 55 are connected or articulated to the tube 48, and each of the control housings contains mechanism for controlling a corresponding joint of the right slave arm 15. Housings 51, 53 and 55 contain mechanism which permits rotation of each housing with respect to the adjacent housing about the longitudinal axis of the interconnecting members. On the other hand, housings 52 and 54 contain mechanism permitting bending movement of the associated connecting members.

The mechanisms enclosed within housings 51 and 52 are shown in Fig. 3. The tube 48 has an upper curved portion which is rigidly secured to the housing 51. A shaft 56 extends through housing 51 into housing 52 and is secured to the latter. Thus, when housing 51 is rotated or twisted about the axis of shaft 56 with respect to the housing 52, a gear 57 on the shaft 56 will rotate with respect to a pinion gear 58 on a shaft 60. This will cause a movable slider or tap to move over its associated potentiometer disposed in a container 61 to develop an electric output signal as will be more fully explained hereinafter. In other words, assuming the housing 51 to rotate with respect to the housing 52 which may be considered to be fixed, the pinion gear 58 will rotate about the fixed gear 57 to cause rotation of the potentiometer slider. If desired, the angle of rotation of the slider may be made greater than that of the housing 51 with respect to the housing 52. The rotary movement of the housing 51 may be limited, for example, by a stop pin 62 on the shaft 56 which engages fixed stops to define its limits of rotation.

As explained hereinbefore, the housing 52 containing mechanism which permits bending motions of its associated member which may, for example, be a hollow tube 65 which is pivoted to the housing 53. As illustrated in Fig. 3, the tube 65 is secured to a gear 66 on a shaft 67. Hence the tube 65 may rotate about the shaft 67 within a suitable slot 68 in the housing 52. The slot 68 permits movement of the tube 65 with respect to the housing 52 through an angle of about 90° and from the solid line position to the dotted line position of the tube 65. A pinion gear 70 fixed to a shaft 71 meshes with the gear 66. Secured to the shaft 71 is a movable slider of a potentiometer disposed within a container 72. Movement of the tube 65 with respect to the housing 52 will cause corresponding movement of the potentiometer slider to develop an electric output signal. Again the gears may be proportioned so that angular movement of the potentiometer slider is larger than that of the tube 65 with respect to its housing.

The housings 53 and 55 contain control mechanism which is identical to that of housing 51. Furthermore, control mechanism identical to that of housing 51 is provided in control box 30 to pivot rotation of tube 48. The housing 54 contains mechanism which is identical to that of housing 52. A hollow tube 75 interconnects housings 54 and 55 and a tube 76 projects from and is fixed to housing 55 and bears a handle 77 which may be gripped by the hand of the operator, as shown in dotted lines in Fig. 2.

Thus, all the operator has to do is to grip the handle 77 and move it into the desired position, whereupon the joints represented by housings 51 to 55 and a corresponding joint within control box 30 will follow the movements of his hand. Any bending or rotational movements of the respective joints will cause movement of the slider and its associated potentiometer to develop an electric output signal. These electric output signals are used to position the corresponding joints of the slave arm. The electric leads or conductors which connect each of the potentiometers with an associated amplifier are not shown in the drawings. These leads may conveniently extend through the respective tubes such as 75, 65 and 48. The electric servo follow-up mechanism which interconnects each joint of the master arm with the corresponding joint of the slave arm 15 will be described later.

For a more detailed explanation of the construction of the right slave arm 15, reference is now made to Figs. 4, 5 and 6. Fig. 4 illustrates in perspective the position of the right slave arm 15 corresponding to that of the master arm as shown in Fig. 2. Figs. 5 and 6 are elevational views of the upper arm and of the forearm respectively. As shown in Fig. 5, the forearm 17 is rotatable with respect to the cylinder portion 13 about a shaft 80. The shaft 80 has secured thereto a worm gear 81 meshing with a worm 82 secured to a shaft 83. The shaft 83 may be selectively rotated in either direction by an electric motor 84. The shaft 80 further bears a gear 85 which meshes with a pinion 86 secured to a shaft 87 and which causes rotation of a slider over a potentiometer disposed in a container 88. The shaft 80 is mounted in suitable bearings 90.

When the motor 84 is energized, it will cause rotation of the worm 82 to drive worm gear 81, which in turn will rotate the shaft 80. At the same time, gear 85 on shaft 80 will rotate pinion 86 to position the slider of the potentiometer in the container 88. The direction of rotation of the electric motor 84 may be controlled so that the shaft 80 can be driven in either direction.

Integral with or secured to shaft 80 and extending through the cylinder portion 13, there is provided a boss 91 having webs 92 which are secured to a rectangular frame 93. A frame 94 of substantially U-shape is pivoted at 20 to the rectangular frame 93. A pair of lugs 95 extend at an angle from the rectangular frame 93 to form a pivot 21 to which is linked a conventional linear actuator 96. The linear actuator 96 includes a rod 97 which can move into and from a cylinder 98. The linear actuator 96 is controlled by an electric motor 100 through a gear box 101.

Since the linear actuator 96, its motor 100 and gear box 101, are secured to the U-shape frame 94, energization of the motor will cause the rod 97 either to extend or retract from the cylinder 98 depending upon the direction of rotation of the motor. Assuming now that the rod 97 extends from its cylinder 98, forearm 17 will pivot about its pivot 20, thereby to move the arm in the direction shown in dotted lines Fig. 5. A gear 102 is secured to the U-shape frame 94 and meshes with a pinion 103 fixed to a shaft 104 on the frame 93. Hence, when the forearm 17 moves or bends, for example, from the full line position to the dotted line position of Fig. 5, the gear 102 will rotate to drive the pinion 103 thereby to rotate its shaft 104. This in turn will cause movement of the slider of its potentiometer disposed in a container 105.

In the lower portion of the U-shape frame 94, there is disposed a motor 106 and gear box 107. The motor 106 and gear box 107 serve the purpose of actuating the rotary joint 22. Extending from the gear box 107 is a shaft 108 to which is secured a disc-like 110 journalled in ball bearing 111. Secured to the member 110 is a pair of ears or lugs 112 providing the pivots 23. Furthermore, a centrally disposed ear 113 extends from the member 110 to provide the pivot 24. A gear 114 is fixed to the member 110 which in turn meshes with a pinion 115 cooperating with a potentiometer in the container 116.

The motor 106, gear box 107 and associated mechanism form a conventional rotary actuator. Accordingly, energization of the motor 106 in a predetermined direction will cause rotation of the shaft 108 and member 110 with respect to the frame 94. Consequently, the forearm 18 will rotate around its longitudinal axis with respect to the upper arm 17. At the same time, the rotation of gear 114 causes corresponding rotation of pinion 115 to position the slider of its potentiometer.

The forearm 18 is generally of the same construction as the upper arm 17 and again includes a linear actuator 118 which comprises a rod 120 linked to pivot 24 which may be extended from or retracted into a cylinder 121. The rod 120 is controlled by an electric motor 122 and gear box 123. A frame 124 of rectangular shape is connected to the pivot 23. The frame 124 is rigidly connected to another frame 125 which in turn supports the motor 122 and gear box 123.

The joint controlled by linear actuator 118 forms what corresponds to the human elbow and operates like the shoulder joint described hereinabove. The energization of the motor 122 extends and retracts rod 120 to rotate about its pivot 24 which will bend the forearm 18 about its pivot 23. The gears and potentiometer for the elbow joint have not been shown in Fig. 5 but they are the same as those of the shoulder joint. The joint 22 of Fig. 5 has been rotated to show the forearm 18 so that it bends in the same plane within which the up and down motion of the upper arm takes place. The normal position of the forearm, of course, will be at right angles to that of Fig. 5.

The lower portion 25 of the forearm or the wrist may be rotated about its common longitudinal axis with the forearm 18. This may be effected by a rotary actuator similar to the one disposed above the elbow joint. The rotary joint is controlled by a motor 126 secured to the frame 125 and includes a gear box 127. A shaft 128 extends from the gear box 127 and is secured to a disc-like member 130 journalled in ball bearing 131. A tube 132 is secured to member 130 and forms the wrist. A gear 133 is fixed to the member 130 and meshes with a pinion 134 for positioning the slider of the potentiometer disposed in the container 135. This rotary joint operates in exactly the same manner as does the rotary joint above the elbow.

The claw 26 is secured to the wrist cylinder and may be controlled by a motor 136 disposed in the cylinder 132. The motor drives a worm 137 secured to a shaft 138 which is controlled by the motor. Worm 137 meshes with a pair of worm gears 140 which are secured to the fingers 141. Opening and closing of the fingers 141 is manually controlled as will be more fully explained hereinafter.

The electric servo follow-up mechanism which interconnects each joint of the master arm with a corresponding joint of the slave arm will now be explained in connection with Fig. 7. Fig. 7 is a circuit diagram of an electrical follow-up mechanism for one of the joints of the master arm and the corresponding joint of the slave arm. Since there are six articulated joints in each of the master and slave devices including the joints which permit rotation of the cylinder 11 with respect to the base 10 of the slave device and corresponding rotation of the master device, six such channels or follow-up mechanisms are provided in the manipulating apparatus of the invention.

Potentiometer or resistor 145 may, for example, correspond to the potentiometer disposed in container 72 of the master arm as indicated by the dotted box 146. The potentiometer 145 is provided with a movable slider or variable tap 147 which is controlled by the pinion 70. Thus the portion of the resistor 145 above tap 147 forms one arm of a Wheatstone bridge while the second arm is formed by the portion of the resistor 145 below the tap 147. The other two arms of the bridge network are formed by a potentiometer or resistor 150 having a movable slider or variable tap 151. The potentiometer 150 and its slider 151 correspond to the potentiometer and slider in the container 105 of the slave arm as indicated by the dotted box 152. Accordingly, the portion of the resistor 150 above its tap 151 forms the third arm of the bridge network while the fourth arm is formed by the portion of the resistor 150 below the tap 151.

A suitable alternating current source schematically indicated at 153 is connected across resistor 145. By means of conductors 154 and 155, resistors 145 and 150 are connected in parallel. An electric motor 156 is provided with two separate field windings 157 and 158 for selectively controlling the direction of rotation of the motor. The motor 156 corresponds to the motor 100 which controls bending or up and down movements of the shoulder joint of the slave arm. As indicated by the dotted line 160, the motor 156 controls the variable tap 151.

The tap 151 may be grounded as shown and accordingly as long as the bridge network is balanced, the voltage obtained from tap 147 is zero with respect to ground. Assuming now that tap 147 is moved by bending tube 65 with respect to its housing 52; accordingly, as explained hereinbefore, the variable tap 147 is moved and an output or error signal is developed between the tap and ground. This error signal may be amplified by an amplifier 161 having its input connected between tap 147 and ground as shown and which may be energized from the source 153 through leads 155, 154 and leads 162, 163. An amplified output signal is obtained from amplifier 161 which is impressed on a motor control circuit 164. Depending on the magnitude of this error signal and depending on its relative phase which depends on whether the tap 147 is moved up or down, the electric motor 156 is energized either through winding 157 or through winding 158. This may be effected by selectively connecting either winding 157 and winding 158 to a battery 165 so that an electric circuit is closed from ground through the motor control circuit either winding 157 or 158, motor 156, battery 165 and back to ground.

Electric follow-up mechanisms of the type described in connection with Fig. 7 are well known. They can be designed so that the slave arm will reach a desired position without overshooting, the movements of the slave arm being rapid and smooth.

It will be evident from an inspection of Fig. 7 that each joint of the master arm must be connected with a corresponding joint of the slave arm through electric conductors. These conductors may, for example, be contained in the cables 170 and 171 shown in Figs. 1 and 2, which interconnect the master and slave devices. The six amplifiers and the control circuits corresponding to the boxes 161 and 164 of Fig. 7 may, for example, be mounted in the cylinder 11 or in separate control boxes, if desired.

The motors 84, 100, 106, 122, 126 and their associated potentiometers may also be connected by insulated conductors, not shown in the drawings. These conductors may extend between the forearm, the upper arm, and the main cylinder 11 of the slave device in any suitable manner. The various alternating current and direct current power supplies may be disposed in the base 10 or in a separate housing not shown.

It will be understood that a rotary actuator will be associated with cylinder 11 for causing its rotation with respect to the fixed base 10. This movement of the slave device is controlled by a suitable mechanism in the master device identical to that shown in the housing 51 and such mechanism is located in the control box 30.

As explained hereinbefore, the slave arm 16 which is the left arm of the slave device, is manually controlled by the push buttons mounted on the control box 30. For example, the push buttons 31 and 32 may control respectively, the movement of the arm 16 away and toward the cylinder 11, while the push buttons 33 and 34 control the swinging movement of the arm into forward and backward positions. The push buttons 35 and 36 control the bending movement of the elbow joint respectively in the up and down direction. The push buttons 37 and 38 control rotation of the rotary joint above the elbow in the right and left hand direction. The push buttons 40 and 41 similarly control rotation of the wrist in the right and left hand direction. Finally, the push buttons 42 and 43 respectively open and close the claw of the slave arm 16. In a similar manner, the toggle switches 44 and 45 control opening and closing of the claw 26 of the right slave arm 15.

It will be understood that the left slave arm 16 may also be automatically controlled in the same manner as is the right slave arm 15. This may be accomplished by providing another master arm similar to that illustrated in Fig. 2. The slave device may be controlled by an operator who grips the handles of the two master arms to cause corresponding movements of both the left slave arm 16 and the right slave arm 15 in the manner previously described. In this case the slave device may be utilized to perform operations requiring the use of two hands.

As shown in Fig. 4, the claw 26 may, for example, grip a beaker 175 by proper control of the toggle switches 44 and 45. The position of the slave arm in Fig. 4 corresponds to that of the master arm in Fig. 2 and it will be evident that a liquid in the beaker may readily be poured into another container. It is feasible to construct the master arm and the slave arm to scale in such a manner that a predetermined movement of the handle 77 of the master arm corresponds to a suitably enlarged or reduced movement of the claw 26 of the slave arm. Hence, it is feasible for the operator to manipulate materials such, for example, as a breaker on a table of reduced scale, while the slave arm will follow the same operations on a larger scale to manipulate corresponding materials. Under such conditions, the operator need not see the slave arm in operation. There are, of course, well known methods such as mirrors, periscopes or television for viewing a remotely controlled slave arm disposed behind protective walls.

Thus it will be seen that the manipulating apparatus of the present invention is versatile and easily operated without extensive practice by the operator. The slave arm is capable of reproducing in three dimensions any movement of the human arm and will faithfully follow the movements of the master arm. In particular, the operator need not pay attention to the various rotary or bending movements of the individual joints which are required to move the arm to a certain position. All he has to do is move the handle of the master arm to the desired position whereupon the slave arm will follow such movements.

What is claimed is:

1. A remotely controlled manipulating apparatus comprising: an arm-like master device having a plurality of joints, said master device having a portion movably connected to a fixed point simulating a shoulder joint and having a free end, thereby to permit movement of said free end of said master device in three dimensions about said fixed point with simulated arm-like movements; a remote arm-like slave device having a plurality of joints corresponding to those of said master device, said slave device having a portion movably connected to a fixed point and having a free end; and a separate servo follow-up mechanism interconnecting each joint of said master device with the corresponding joint of said slave device and including a motor for positioning said corresponding joint of said slave device, whereby movement of said free end of said master device by an operator causes automatically a corresponding movement in space of said free end of said slave device.

2. A remotely controlled manipulating apparatus comprising: an arm-like master device having a plurality of members interconnected by joints, said master device having one end of one of its members articulated to a fixed point simulating a shoulder joint and having a free end, one of said joints of said master device permitting bending movement of its associated members, another one of said joints of said master device permitting rotation about the longitudinal axes of its associated members, thereby to permit movement of said free end of said master device in three dimensions about said fixed point with simulated arm-like movements; a remote arm-like slave device having a plurality of members interconnected by joints corresponding to those of said master device, said slave device having one end of its members articulated to a fixed point and having a free end, one of said joints of said slave device permitting bending movement of its associated members, another one of said joints of said slave device permitting rotation about the longitudinal axes of its associated members; and a separate servo follow-up mechanism interconnecting each joint of said master device with the corresponding joint of said slave device and including a motor for positioning said corresponding joint of said slave device, whereby movement of said free end of said master device by an operator causes automatically a corresponding movement in space of said free end of said slave device.

3. A remotely controlled manipulating apparatus comprising: a master arm having a plurality of members interconnected by joints, said master arm having one end of one of its members articulated to a fixed point simulating a shoulder joint and having a free end, at least one of said joints of said master arm permitting bending movement of its associated members, at least another one of said joints of said master arm permitting rotation about the longitudinal axes of its associated members, thereby to permit movement of said free end of said master arm in three dimensions about said fixed point with simulated arm-like movements; a remote slave arm having a plurality of members interconnected by joints corresponding to those of said master arm, said slave arm having one end of one of its members articulated to a fixed point and having a free end, at least one of said joints of said slave device permitting bending movement of its associated members, at least another one of said joints of said slave device permitting rotation about the longitudinal axes of its associated members; and a separate electric follow-up mechanism interconnecting each joint of said master arm with the corresponding joint of said slave arm and including an electric motor for positioning said corresponding joint of said slave arm, whereby movement of said free end of said master arm by an operator causes automatically a corresponding movement in space of said free end of said slave arm.

4. A remotely controlled manipulating apparatus comprising: an arm-like master device having a portion movably connected to a fixed point and having a free end, said master device having a plurality of joints permitting movement in space of said free end by an operator about said fixed point; an arm-like slave device disposed remote from said master device and having a portion movably connected to a fixed point and having a free end, said slave device having a plurality of joints corresponding to those of said master device; a master potentiometer associated with each joint of said master device and including a movable tap operable in unison with movement of its joint; a slave potentiometer associated with each joint of said slave device and including a movable tap; an electric motor associated with each joint of said slave device and arranged to actuate its joint upon energization thereof; means interconnecting each motor with the tap of its associated slave potentiometer to position said tap; and electric circuit means associated with each of said motors and its master potentiometer and its slave potentiometer for energizing said motor in response to movement of tap of its master potentiometer until the tap of its slave potentiometer reaches a neutral position, whereby said slave device will automatically follow movements of said master device in space.

5. A remotely controlled manipulating apparatus comprising: a master arm having a portion articulated to a fixed point and having a free end, said master arm having a plurality of joints permitting movement in space of said free end by an operator about said fixed point; a slave arm disposed remote from said master arm and having a portion articulated to a fixed point and having a free end, said slave arm having a plurality of joints corresponding to those of said master arm; a master potentiometer associated with each joint of said master arm and including a movable tap operable in unison with movement of its joint; a slave potentiometer associated with each joint of said slave arm and including a movable tap; a reversible electric motor associated with each joint of said slave arm and arranged to actuate its joint upon energization thereof; means interconnecting each motor with the tap of its associated slave potentiometer to position said tap, each of said master potentiometers and its tap being connected with the associated slave potentiometer and its tap to form a bridge network; and electric circuit means associated with each of said motors and its bridge network for energizing said motor in response to movement of the tap of its master potentiometer until the tap of its slave potentiometer balances its bridge network, whereby said slave arm will automatically follow movements of said master arm in space.

6. A remotely controlled manipulating apparatus comprising: a master arm having a plurality of members interconnected by articulated joints, said master arm having one end of one of said members movably connected to a fixed point and having a free end, one of said joints of said master arm permitting bending movement of its associated members, another one of said joints of said master arm permitting rotation about the longitudinal axes of its associated members, thereby to permit movement in space of said free end by an operator about said fixed point; a slave arm disposed remote from said master arm and having a plurality of members interconnected by articulated joints corresponding to those of said master arm, said slave arm having one end of one of its members movably connected to a fixed point and having a free end, one of said joints of said slave arm permitting bending movement of its associated members, another one of said joints of said slave arm permitting rotation about the longitudinal axes of its associated members; a master potentiometer associated with each joint of said master arm and including a movable tap operable in unison with movement of its joint; a slave potentiometer associated with each joint of said slave arm and including a movable tap; an electric motor associated with each joint of said slave arm and arranged to actuate its joint upon energization thereof; means interconnecting each motor with the tap of its associated slave potentiometer to position said tap; and electric circuit means associated with each of said motors and its master potentiometer and its slave potentiometer for energizing said motor in response to movement of the tap of its master potentiometer until the tap of its slave potentiometer reaches a neutral position, whereby said slave arm will automatically follow movements of said master arm in space.

7. A remotely controlled manipulating apparatus comprising: a master arm having a plurality of members interconnected by articulated joints, said master arm having one end of one of its members movably connected to a fixed point and having a free end, one of said joints of said master arm permitting bending movement of its associated members, another one of said joints of said master arm permitting rotation about the longitudinal axes of its associated members, thereby to permit movement in space of said free end by an operator about said fixed point; a slave arm disposed remote from said master arm and having a plurality of members interconnected by articulated joints corresponding to those of said master arm, said slave arm having one end of one of its members movably connected to a fixed point and having a free end, one of said joints of said slave arm permitting bending movement of its associated members, another one of said joints of said slave arm permitting rotation about the longitudinal axes of its associated members; a master potentiometer associated with each joint of said master arm and including a movable tap operable in unison with movement of its joint; a slave potentiometer associated with each joint of said slave arm and including a movable tap; a reversible electric motor associated with each joint of said slave arm and arranged to actuate its joint upon energization thereof; means interconnecting each motor with the tap of its associated slave potentiometer to position said tap, each of said master potentiometers and its tap being connected with the associated slave potentiometer and its tap for forming a bridge network; and electric circuit means including an amplifier associated with each of said motors and its bridge network for energizing said motor in response to movement of the tap of its master potentiometer until the tap of its slave potentiometer balances its bridge network, whereby said slave arm will automatically follow movements of said master arm in space.

8. A remotely controlled manipulating apparatus comprising: an arm-like master device having a plurality of members interconnected by articulated joints, said master device having one end of one of its members rotatably connected to a fixed point by a first one of said joints and having a free end, at least one of said joints of said master device permitting bending movement of its associated members, at least another one of said joints including said first one of said joints of said master device permitting rotation about the longitudinal axes of its associated members, thereby to permit movement in space of said free end by an operator about said fixed point; an arm-like slave device disposed remote from said master device and having a plurality of members interconnected by articulated joints corresponding to those of said master device, one of said members of said slave device being disposed substantially vertically, said slave device having one end of said one of its members rotatably connected to a fixed point by a first one of said joints and having a free end, at least one of said joints of said slave device permitting bending movement of its associated members, at least another one of said joints including said first one of said joints of said slave device permitting rotation about the longitudinal axes of its associated members; a master potentiometer associated with each joint of said master device and including a movable tap operable in unison with movement of its joint; a slave potentiometer associated with each joint of said slave device and including a movable tap; a reversible electric motor associated with each joint of said slave device and arranged to actuate its joint upon energization thereof in a desired direction; means interconnecting each motor with the tap of its associated slave potentiometer to position tap in a desired direction; and electric circuit means including an amplifier associated with each of said motors and its master potentiometer and its slave potentiometer for energizing said motor in response to movement of the tap of its master potentiometer until the tap of its slave potentiometer reaches a neutral position, whereby said slave device will automatically follow movements of said master device in space.

9. A remotely controlled manipulating apparatus comprising: an arm-like master device having a plurality of members interconnected by articulated joints, said master device having one end of one of its members rotatably connected to a fixed point by a first one of said joints and having a free end, at least one of said joints of said master device permitting bending movement of its associated members, at least another one of said joints including said first one of said joints of said master device permitting rotation about the longitudinal axes of its associated members, thereby to permit movement in space of said free end by an operator about said fixed point; an arm-like slave device disposed remote from said master device and having a plurality of members interconnected by articulated joints corresponding ot those of said master device, one of said members of said slave device being disposed substantially vertically, said slave device having one end of said one of its members rotatably connected by a first one of said joints to a fixed point and having a free end, at least one of said joints of said slave device permitting bending movement of its associated members, at least another one of said joints including said first one of said joints of said slave device permitting rotation about the longitudinal axes of its associated members; a master potentiometer associated with each joint of said master device and including a movable tap operable in unison with movement of its joint; a slave potentiometer associated with each joint of said slave device and including a movable tap; a reversible electric motor associated with each joint of said slave device and arranged to actuate its joint upon energization thereof in a desired direction of rotation; means interconnecting each motor with the tap of its associated slave potentiometer to position said tap, each of said master potentiometers and its tap being connected with the associated slave potentiometer and its tap to form a bridge network; and electric circuit means including an amplifier associated with each of said motors and its bridge network for energizing said motor in the desired direction in response to movement of the tap of its master potentiometer until the tap of its slave potentiometer balances its bridge network, whereby said slave device will automatically follow movements of said master device in space.

10. A remotely controlled manipulating apparatus comprising; an arm-like master device including an arm-like master member having a shoulder-like joint permitting movement of said master member in three dimensions substantially about two axes associated with said joint, said master device having a free end; a remote arm-like slave device including an arm-like slave member having a shoulder-like joint, said slave member and joint corresponding to said master member and joint, said slave device having a free end; and servo follow-up mechanisms interconnecting said master and slave members and including motors for positioning said slave member, whereby movement of said free end of said master device by an operator causes automatically a corresponding movement in space of said free end of said slave device.

11. A remotely controlled manipulating apparatus comprising: an arm-like master device including arm-like master members having a shoulder-like joint adjacent an end of one of said members permitting movement of said one of said members in three dimensions substantially about two axes associated with said joint, one of said members having a wrist-like joint adjacent an end thereof permitting rotational movement at said wrist-like joint, said master device having a free end; a remote arm-like slave device including arm-like slave members having a shoulder-like joint and a wrist-like joint, said slave member and joints corresponding to said master member and joints, said slave device having a free end; and servo follow-up mechanisms interconnecting said master and slave members and including motors for positioning said slave members, whereby movement of said free end of said master device by an operator causes automatically a corresponding movement in space of said free end of said slave device.

12. A remotely controlled manipulating apparatus comprising: an arm-like master device having a plurality of joints, said master device having a portion connected to a fixed point simulating a shoulder joint and having a free end, thereby to permit movement of said free end of said master device in three dimensions about said fixed point with simulated arm-like movements; a pedestal including a first member fixed in space and a second member movable relative to the first member; a remote arm-like slave device having a plurality of joints corresponding to those of said master device, said slave device having a portion connected to the second member of said pedestal and having a free end; and a separate servo follow-up mechanism interconnecting each joint of said master device with the corresponding joint of said slave device and including a motor for positioning said corresponding joint of said slave device, whereby movement of said free end of said master device by an operator causes automatically a corresponding movement in space of said free end of said slave device.

13. A remotely controlled manipulating apparatus comprising: an arm-like master device having a plurality of joints, said master device having a portion movably connected to a fixed point simulating a shoulder joint and having a free end, thereby to permit movement of said free end of said master device in three dimensions about said fixed point with simulated arm-like movements; an upright pedestal including a lower extremity member and an upper trunk-like member movable relative to the lower extremity member; a remote arm-like slave device having a plurality of joints corresponding to those of said master device, said slave device having a portion movably connected to the upper trunk-like member of said pedestal; and a separate servo follow-up mechanism interconnecting each joint of said master device with the corresponding joint of said slave device and including a motor for positioning said corresponding joint of said slave device, whereby movement of said free end of said master device by an operator causes automatically a corresponding movement in space of said free end of said slave device.

14. A remotely controlled manipulating apparatus comprising: an arm-like master device having a plurality of joints, said master device having a portion movably connected to a fixed point simulating a shoulder joint and having a free end, thereby to permit movement of said free end of said master device in three dimensions about said fixed point with simulated arm-like movements; an upright pedestal including a lower extremity member and an upper trunk-like member having a first portion movable relative to the lower extremity member and a second portion movable relative to the first portion; a remote arm-like slave device having a plurality of joints corresponding to those of said master device, said slave device having a portion movably connected to the second portion of the trunk-like member of said pedestal and having a free end; and a separate servo follow-up mechanism interconnecting each joint of said master device with the corresponding joint of said slave device and including a motor for positioning said corresponding joint of said slave device, whereby movement of said free end of said master device by an operator causes automatically a corresponding movement in space of said free end of said slave device.

References Cited in the file of this patent

UNITED STATES PATENTS

| | | |
|---|---|---|
| 1,880,138 | Hubl | Sept. 27, 1932 |
| 2,583,058 | Libman | Jan. 22, 1952 |

FOREIGN PATENTS

| | | |
|---|---|---|
| 174,407 | Austria | Mar. 25, 1953 |

UNITED STATES PATENT OFFICE

CERTIFICATE OF CORRECTION

Patent No. 2,858,947                                                            November 4, 1958

Harvey G. Chapman, Jr.

It is hereby certified that error appears in the printed specification of the above numbered patent requiring correction and that the said Letters Patent should read as corrected below.

Column 8, line 35, for "breaker" read -- beaker --; column 9, line 74, for "of tap" read -- of the tap --; column 10, line 9, for "disposd" read -- disposed --; column 11, line 60, after "position" insert -- said --; column 12, line 10, for "ot" read -- to --; line 41, for "comprising;" read -- comprising: --.

Signed and sealed this 3rd day of February 1959.

(SEAL)
Attest:

KARL H. AXLINE
Attesting Officer

ROBERT C. WATSON
Commissioner of Patents